United States Patent

Zemon et al.

[11] 4,068,191
[45] Jan. 10, 1978

[54] ACOUSTOOPTIC MODULATOR FOR OPTICAL FIBER WAVEGUIDES

[75] Inventors: Stanley A. Zemon, Boston; Mark L. Dakss, Waltham, both of Mass.

[73] Assignee: GTE Laboratories Incorporated, Waltham, Mass.

[21] Appl. No.: 763,847

[22] Filed: Jan. 31, 1977

Related U.S. Application Data

[63] Continuation of Ser. No. 606,910, Aug. 22, 1975, abandoned.

[51] Int. Cl.² .............................................. H01S 3/10
[52] U.S. Cl. ....................... 331/94.5 M; 350/96 WG; 350/161 W
[58] Field of Search ............... 331/94.5 M, 94.5 Q; 350/161 W, 96 WG

[56] References Cited

U.S. PATENT DOCUMENTS

| | | | |
|---|---|---|---|
| 3,435,372 | 3/1969 | Aas et al. | 331/94.5 M |
| 3,464,027 | 8/1969 | DeMaria | 331/94.5 M |
| 3,495,894 | 2/1970 | Lenzou et al. | 350/161 W |
| 3,544,916 | 12/1970 | Angelbeck | 331/94.5 M |
| 3,571,737 | 3/1971 | Miller | 331/94.5 M |

*Primary Examiner*—William L. Sikes
*Attorney, Agent, or Firm*—David M. Keay; Irving M. Kriegsman

[57] ABSTRACT

An acoustooptic modulator is disclosed in which light may be modulated while propagating through an optical fiber waveguide through the use of focussed acoustic waves. The modulator is formed by encircling a portion of the optical fiber waveguide in an optical communications system with an acoustic transducer. Due to the encircling of a portion of the waveguide by the transducer, the acoustic waves which are generated in the optical fiber waveguide material are focussed inwardly to the center so that the energy densities where acoustooptic modulation occurs are high. Therefore, the acoustic driving powers and modulation efficiencies are highly favorable.

10 Claims, 3 Drawing Figures

ACOUSTOOPTIC MODULATOR FOR OPTICAL FIBER WAVEGUIDES

This is a continuation of application Ser. No. 606,910 filed Aug. 22, 1975, and now abandoned.

BACKGROUND OF THE INVENTION

This invention is related generally to light modulating systems and is more particularly concerned with a novel device for direct integration into a optical fiber communications system in which modulation is accomplished within the fiber optic waveguide.

The use of "light" frequency electromagnetic energy for communication purposes has been recently brought much closer to reality through the production of extremely low loss optical fibers and the extension of continuous wave (CW) room temperature operation of diode lasers to over 10,000 hours. The new optical fibers exhibit approximately 2 db of loss per kilometer.

For optical fiber communications system to become a practical reality, other efficiencies within the system must also be greatly improved. For example, whenever the waveguide undergoes a configurational transition, a loss in efficiency occurs. Furthermore, whenever conversion is required between electrical and optical forms of energy, considerable loss of efficiency is experienced.

For light to be utilized as a communication vehicle in an all cylindrical optical fiber waveguide system, it is necessary that the light be modulated in some manner. Furthermore, it is necessary that the modulation technique be sufficiently fast so that practical data rates are achieved. Such data rates cannot be achieved by direct modulation of a laser source such as by modulating the exciting energy source.

Therefore, direct incorporation of a laser into an optical fiber waveguide cannot per se solve the modulation problem.

Many electro-optic, magneto-optic and acooustooptic modulation mechanisms have been evolved for use in a planar optical waveguide configuration. However, as mentioned previously, a distinct loss in efficiency occurs when light is coupled from a circular optical fiber waveguide, which is conceded to be the only commercially feasible transmission waveguide, into a planar waveguide.

SUMMARY OF THE INVENTION

It is, therefore, an object of the present invention to provide a novel modulation technique which is directly introducible into an optical fiber.

It is a second object of the invention to provide such a modulation technique in which substantial data rates may be achieved.

It is another object of the invention to provide such a technique which is simple in construction and readily adaptable to conventional optical waveguides.

Briefly, the invention in its broadest aspect is an acousto-optic modulator for optical fiber waveguides. The modulator includes a length of optical fiber waveguide adapted to guide only a small number of discrete modes of light and which has an index of refraction profile that confines light modes propagating therethrough to the axially adjacent portion of the waveguide. An acoustic transducer is in intimate contact with the optical fiber waveguide around at least a portion of its circumference and along at least a portion of its length, and comprises a first electrode in intimate contact with the optical fiber waveguide, a second electrode uniformly spaced from the first electrode, and a layer of piezoelectric material interposed between the electrodes. Means are provided for generating an rf voltage across the first and second electrodes to generate an acoustic wave in the optical fiber waveguide, the acoustic wave being focussed into the axially adjacent waveguide portion to couple a portion of the light propagated within one of the guided modes into other modes.

Further objects, advantages and features of the invention will be apparent in the arrangement and construction of the constituent parts, in detail, as set forth in the following specification taken together with the accompanying drawing.

DETAILED DESCRIPTION OF THE PREFERRED EMBODIMENT

Figure 1:
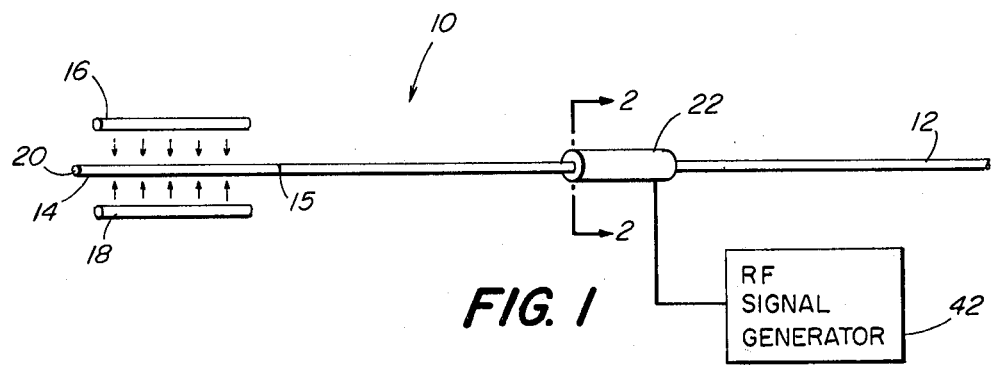
FIG. 1 is an oblique, partially schematic view of a portion of an optical fiber communications system incorporating the present invention.

In referring to the various figures of the drawing hereinbelow, like reference numerals will be utilized to refer to identical parts of the apparatus.

Referring initially to FIG. 1, there is shown the initial portion of an optical fiber communications system according to the present invention to which the reference numeral 10 generally refers. An optical fiber waveguide 12, which is preferably capable of supporting either only a single mode or a small number of modes, forms the primary part of the apparatus 10. Such an optical fiber will be referred to herein as a mode restriction optical fiber waveguide. The initial portion of the optical fiber waveguide 12 is an integrated optical fiber laser 14. Such integrated optical fiber lasers are well known in the art. The laser 14 is coupled at a point 15 to the remaining portion of the optical fiber waveguide 12 either by fusion or by other suitable means so that the junction is not a source of significant loss. Also, light emitting diodes may be directly coupled into an optical communications system and may be utilized. Such a device is shown and described in a copending application, Ser. No. 524,695, filed Nov. 18, 1974, by H. J. Ramsey et al., which is assigned to the assignee of the present invention and which is incorporated by reference.

The fiber laser 14 is optically pumped by a suitable source, such as a pair of flash-lamps 16 and 18. The end surfaces 15 and 20 of the fiber laser 14 are suitably reflective to provide optimum coupling into the optical fiber waveguide 12.

Figure 2:
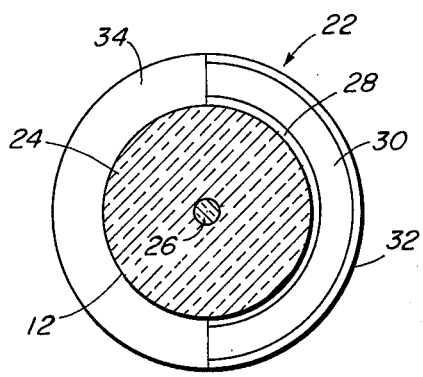
FIG. 2 is an enlarged cross-sectional view of a portion of the communications system shown in FIG. 1 taken along the line 2—2 and showing a preferred construction for an acoustooptic modulator according to the present invention.

An acoustooptic modulator 22 according to the present invention is provided in intimate contact with the exterior of the optical fiber waveguide 12 at a point downstream from the fiber laser 14. An enlarged view of a preferred embodiment of the acoustooptic modulator 22 is shown in FIG. 2 of the drawing. In this embodiment, the optical fiber waveguide 12 is comprised of a cylindrical core 26 which is optically transparent at the emission wavelength of the laser source 14. A cladding 24 surrounds the core 26 and is in intimate contact with it. The index of refraction of the cladding 24 at the emission wavelength of the source 14 is less than the index of refraction of the core 26 at the wavelength. The acoustooptic modulator 22 includes an acoustic transducer in intimate contact with the exterior of the cladding 24 around at least a portion of its circumference and along at least a portion of the length of the optical fiber waveguide 12.

Alternatively, other optical fiber waveguide configurations may also be utilized. For example, so-called graded index fibers are wholly acceptable. The requirement of the invention is that the optical fiber waveguide have an index of refraction profile which confines light propagating through the waveguide to a portion of the waveguide which is adjacent to its axis.

The acoustic transducer shown in the embodiment of FIG. 2 includes a first electrode 28, such as a thin metallic film, which is in intimate contact with the cladding material 24 of the optical fiber waveguide. The metallic film 28 at least partially encircles the outer surface of the cladding 24. On top of the metallic film 28 is disposed a layer 30 of a piezoelectric material, such as lithium niobate. Finally, a second thin metallic film electrode 32 is emplaced on top of the piezoelectric material 30 and is uniformly spaced from the first electrode 28. The acoustic transducer, thus produced, is known as a bulk wave transducer and serves to convert rf signals applied across the electrodes into acoustic waves of the same frequency as the rf signal.

Since the optical fiber waveguide 12 has a circular geometry and the acoustooptic transducer emplaced thereon retains that geometry, the acoustic wave transduced into the optical fiber waveguide is focussed into the fiber core 26 where the major portion of the optical energy propagated through the fiber 12 is carried. A typical single mode optical fiber wave-guide has a core 26 whose diameter is approximately 5 micrometers; therefore, the acoustic energy density at the core is increased by a factor of 50 or more through the focussing action of the circular geometry. Therefore, a significant savings of generating power is accomplished. The preferred embodiment includes an acoustic absorber 34 emplaced around the remainder of the circumference of the optical fiber waveguide 12 to suppress undesired acoustic reflections. Wax is a convenient material for use and as an acoustic absorber.

The extent to which the acoustooptic transducer encircles the periphery of the optical fiber waveguide 12 is a matter of choice. However, the presently preferred arrangement is for the transducer to encircle approximately 180° of the outside of the optical waveguide 12. Less encirclement diminishes the amount of acoustic energy which may be coupled into the fiber while greater than 180° encirclement allows for the creation of a partially resonant structure since complete damping cannot be accomplished.

The bulk acoustic waves generated by the transducer serve to modulate the optical waves propagating through the optical fiber waveguide 12. Two types of bulk acoustic waves may be generated depending upon the crystallographic orientation of the piezoelectric film 30. Where the acoustic vibrations are longitudinal, or parallel to the propagation direction, the propagated light is converted to unguided, or radiated, modes. In other words, direct intensity modulation of the output from a mode restricted fiber is effected.

Conversely, if the acoustic vibrations are perpendicular to the propagation direction of the light, shear acoustic waves are generated. The shear acoustic waves serve to mode convert the propagating light between the TE and TM modes because the acoustic shear strain couples the electric field of one mode to an optical polarization field which, in turn, generates the other mode. Since the TE and TM modes of the same order in a circular waveguide may be degenerate, 100% modulation can be obtained for an appropriate combination of acoustic power level and acoustooptic interaction length. To discriminate between the two perpendicularly polarized modes, a suitable mode discriminator can be introduced into the system to provide an intensity modulation output.

Figure 3:
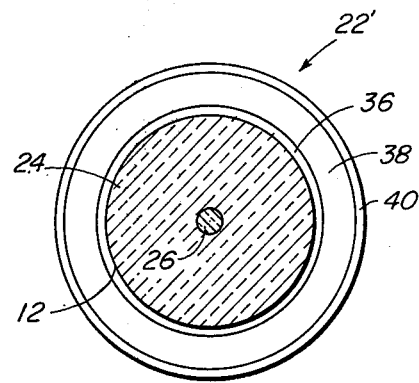
FIG. 3 is an enlarged cross-sectional view similar to that of FIG. 2 showing an alternative embodiment for the acoustooptic modulator.

An alternative embodiment of the present invention is shown in FIG. 3 and is identified generally by the reference numeral 22'. Once again, the acoustic transducer is disposed around the periphery of an optical fiber waveguide 12 which is comprised of a central core 26 and a surrounding cladding 24 as described above. In this embodiment, the acoustic transducer which is comprised of electrodes 36 and 40 with an interposed piezoelectric layer 38 completely encircles the outside of optical fiber waveguide 12 thereby creating an acoustic resonator configuration. The resonant wavelengths are $$\lambda = (2/n)(2b)$$

where $n$ equals a whole number and $b$ is the outer radius of the optical fiber waveguide 12. A standing wave pattern is generated within the resonator configuration thereby enhancing the acoustic power at the center of the resonator where the light propagating portion of the optical fiber waveguide 12 is disposed.

While there have been shown and described what are considered to be preferred embodiments of the present invention, it will be obvious to those skilled in the art that various changes and modifications may be made therein without departing from the invention as defined in the appended claims.

We claim:

1. An acousto-optic modulator integrated into an optical fiber waveguide comprising:
   a length of optical fiber waveguide adapted to guide only a small number of discrete modes of light and having an index of refraction profile which confines light modes propagating therethrough to the portion of the waveguide adjacent to its axis;
   an acoustic transducer in intimate contact with the optical fiber waveguide around at least a portion of its circumference and along at least a portion of its length, the acoustic transducer including
      a first electrode in intimate contact with the optical fiber waveguide,
      a second electrode uniformly spaced from the first electrode, and
      a layer of piezoelectric material interposed between the first and second electrodes; and
   means for generating and applying an rf signal voltage across the first and second electrodes to generate acoustic waves of the same frequency as the applied rf signal voltage in the optical fiber waveguide, the acoustic waves being focussed into said axially adjacent waveguide portion to couple at least a portion of the light propagating within one of the guided modes into other modes and thereby intensity modulate the light propagating within that guided mode.

2. An acousto-optic modulator according to claim 1, wherein the optical fiber waveguide is a mode restricted optical waveguide.

3. An acousto-optic modulator according to claim 2, wherein the acoustic transducer encircles 180° of the circumference of the optical fiber waveguide.

4. An acousto-optic modulator according to claim 3, wherein there is further included a layer of an acoustic absorbing material in contact with the remaining 180° of the circumference of the optical fiber waveguide.

5. An acousto-optic modulator according to claim 2, wherein the first and second electrodes are thin metallic films.

6. An acousto-optic modulator according to claim 5, wherein the piezoelectric material is lithium niobate.

7. An acousto-optic modulator according to claim 2, wherein the piezoelectric material of the acoustic transducer is oriented to generate longitudinal acoustic waves in the optical fiber waveguide thereby producing intensity modulation of light propagating through the optical fiber waveguide.

8. An acousto-optic modulator according to claim 2, wherein the piezoelectric material of the acoustic transducer is oriented to generate shear acoustic waves thereby producing polarization modulation of light propagating through the optical fiber waveguide.

9. An acousto-optic modulator according to claim 2, wherein the acoustic transducer completely encircles the circumference of the optical fiber waveguide thereby forming an acoustic resonant cavity.

10. An acousto-optic modulator according to claim 1, wherein the length of optical fiber waveguide further includes a laser source.

* * * * *